Patented Oct. 30, 1923.

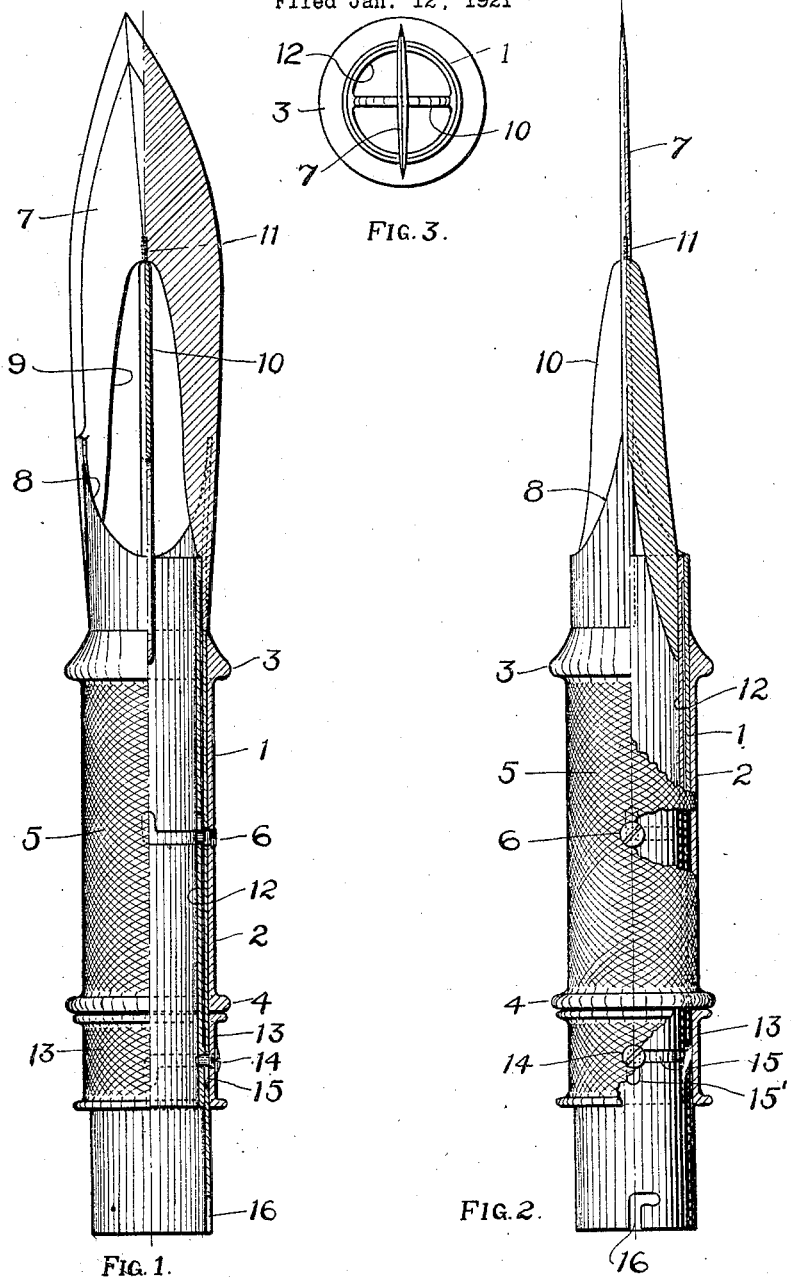

1,472,378

UNITED STATES PATENT OFFICE.

WILLIAM B. WESCOTT, OF WELLESLEY, MASSACHUSETTS, ASSIGNOR, BY MESNE ASSIGNMENTS, TO AMERICAN PROTEIN CORPORATION, OF BOSTON, MASSACHUSETTS, A CORPORATION OF MASSACHUSETTS.

TROCAR.

Application filed January 12, 1921. Serial No. 436,653.

*To all whom it may concern:*

Be it known that I, WILLIAM B. WESCOTT, a citizen of the United States of America, and resident of Wellesley, in the county of Norfolk and State of Massachusetts, have invented new and useful Improvements in Trocars, of which the following is a specification.

This invention relates to a trocar particularly designed for use in obtaining blood from animals at the time of slaughter in a condition suitable for use as human food or for therapeutic purposes. The invention has to do with that type of instrument which has a blade fixed to a tubular handle which constitutes a cannula adapted to follow the blade into the cut, and through which blood may be conducted from the interior of the body penetrated by the blade to a suitable pipe or tube leading to a container, without coming in contact with the outside of the animal, or with any contaminating influences exterior to the tissues severed by the blade.

In the use of instruments of this kind heretofore used some difficulty has been encountered due to the tendency of the walls of the cut to close around the inlet end of the cannula, and between the end of the cannula and the interior region of the incision where a large blood vessel is cut, thus obstructing the free flow of the blood to and through the cannula and causing the blood to permeate into the tissues around the cut. The principal object of the present invention is to provide an improved instrument which will keep the passage open from the region of the inner part of the cut to the entrance of the cannula.

The invention resides principally in the means hereinafter described and particularly pointed out in the claims for spreading apart the walls of the cut tissues in the region of the entrance of the cannula and for a substantial distance toward the inner part of the cut to facilitate the flow of blood therethrough.

In the accompanying drawings which illustrate a preferred embodiment of the invention:—

Fig. 1 is a side elevation, half in longitudinal section, of my improved trocar;

Fig. 2 is a side elevation viewed at right angles to Fig. 1, partly in section and partly broken away; and Fig. 3 is an end view of the bladed end of the trocar.

The handle of the trocar constitutes the cannula and consists of the inner tube 1 and the shorter outer tube 2. The latter has flanges or beads 3 and 4 at its ends and a knurled or roughened surface 5 to provide a firm hand grip. The tubes 1 and 2 are fastened together against relative rotation by the set screw 6. Fixed to the forward end of the tube 1 is a pointed blade 7, the base of which extends across the tube. The edge of the forward end of tube 1 is curved at each side of its blade so as to merge gradually into the plane of the blade at each side as shown at 8, thus permitting the cannula to slip freely into the cut formed by the blade.

A part of the blade body is cut away as shown at 9, and in the space so formed is a rotatable spreader member 10, which conforms in shape to the opening 9, and when turned into the plane of the blade forms in effect a continuation of the blade body. The spreader 10 tapers from its rear end or base forward, and is provided at its forward end with a pivot pin 11 which fits into a corresponding socket in the forward end of the opening 9. The rear end or base of the spreader 10 is fixed to a tubular shell 12 which constitutes a support for the spreader and is mounted to turn freely inside of the tube 1. The shell 12 extends beyond the lower end of the outer tube 2 and is connected to an exteriorly knurled actuating sleeve 13 mounted on tube 1 below tube 2, by means of a set screw 14 which extends through a bayonet slot 15 in tube 1.

The lower end of tube 1 is provided with a bayonet slot 16 for attachment to a flexible pipe or tube (not shown) running to a container.

In operation the user turns the spreader member 10, by means of the sleeve 13, into the plane of the blade 7, in which position it forms practically a part of the blade. He then thrusts the blade into the creature to be operated upon in such manner that the blade will enter a large blood vessel, while the forward end of the cannula will follow the blade into the opening of the wound, its entrance being facilitated by the forwardly tapered edges 8 of the tube. The spreader being flatwise of the blade will not interfere with the ready entrance of the instrument into the animal. With the blade and forward end of the cannula now buried in the body of the animal, the operator gives the actuating sleeve 13 a quarter turn, limited by the slot 15, thereby rotating the spreader 10, through shell 12, to the position shown in the drawing at right angles to the blade. Then by shifting the sleeve 13 longitudinally of the cannula to bring the screw 14 to the end of the offset 15' of the bayonet slot, the spreader 10 is locked in its operative position transverse of the blade. The pivot pin 11 is sufficiently long so that this slight endwise movement will not pull the pin out of its socket. In this transverse position the spreader 10 will spread the tissues cut by the blade and hold the walls of the cut apart in the region of the entrance of the cannula, and for a substantial distance toward the end of the blade, thus permitting the blood to flow freely from the interior of the cut into the end of the tubular handle or cannula, and thence to any suitable container. The aperture 9 forms an opening to the inlet end of the cannula at both sides of the blade so that if the flow of the blood should be more copious at one side of the blade than the other, substantially the entire cross sectional area of the cannula will be available to carry it away.

I claim:

1. An instrument for withdrawing blood from food animals at the time of their slaughter, comprising a cannula, a blade for forming an incision in the animal, and movable means adapted to spread apart the lips of the incision formed by the blade.

2. An instrument for withdrawing blood from food animals at the time of their slaughter, comprising a cannula, a blade for forming an incision in the animal, and means for spreading apart the walls of the incision, adapted in one position to lie flatwise of the blade and capable of movement into another position to lie at an angle to the blade.

3. An instrument for withdrawing blood from food animals at the time of their slaughter, comprising a cannula, a blade for forming an incision in the animal, and a rotatable spreader capable of movement from a position in a plane flatwise of the blade to a plane substantially at right angles thereof.

4. An instrument for withdrawing blood from food animals at the time of their slaughter, comprising a cannula, a blade for forming an incision in the animal, a movable spreader member and means mounted upon the exterior of the cannula for operating the spreader member.

5. An instrument for withdrawing blood from food animals at the time of their slaughter, comprising a cannula, a blade for forming an incision in the animal, a rotatable spreader and an actuating member on the exterior of the cannula for rotating the spreader.

6. An instrument for withdrawing blood from food animals at the time of their slaughter, comprising a cannula, a blade capable of forming the usual slaughtering incision in the animal, a movable spreader member, and means mounted upon the cannula for operating the spreader member to spread apart the walls of the incision.

7. A trocar comprising a cannula, a blade having an aperture in its body, and a spreader rotatably mounted in said aperture adapted to lie substantially in the plane of the blade, and also to be rotated to a position transverse of the plane of the blade.

8. A trocar comprising a cannula, a blade having an aperture in its body, and a spreader rotatably mounted in said aperture adapted to lie substantially in the plane of the blade, and also to be rotated to a position transverse of the plane of the blade, and an actuating member on the exterior of the cannula to operate the spreader.

9. A trocar comprising a cannula, a blade having an aperture in its body, a spreader positioned in said aperture, a support to which the spreader is fixed mounted to rotate in the cannula, and an actuating member on the exterior of the cannula to rotate said support and spreader.

10. A trocar comprising a cannula, a blade having an aperture in its body, a spreader positioned in said aperture, a tubular shell to which the spreader is fixed mounted to rotate inside of the cannula, and an actuating member on the exterior of the cannula to rotate said tubular shell and spreader.

11. A trocar comprising a cannula, a blade having an aperture in its body, and a spreader rotatably mounted in said aperture adapted to lie substantially in the plane of the blade, and also to be rotated to a position transverse of the plane of the blade, and means to lock the spreader in its transverse position.

12. A trocar comprising a cannula having an inner tube and an outer tube fastened together, the outer tube constituting a hand hold, a blade fixed to the inner tube having an aperture in its body, a spreader positioned in said aperture, a pivot connection between the forward end of the spreader and the forward end of said aperture, a tubular shell to which the rear end of the spreader is fixed mounted to rotate inside of the cannula, and an actuating sleeve on the inner tube of the cannula beyond the end of the outer sleeve to rotate said tubular shell and spreader.

Signed by me at Boston, Massachusetts, this 1st day of December, 1920.

WILLIAM B. WESCOTT.